United States Patent
Scott et al.

(10) Patent No.: US 11,425,712 B2
(45) Date of Patent: Aug. 23, 2022

(54) CROSS-LAYER DESIGN FOR CLOSED LOOP FEEDBACK IN A WIRELESS NETWORK

(71) Applicant: The Boeing Company, Chicago, IL (US)

(72) Inventors: James P. Scott, Manhattan Beach, CA (US); David La Rue, Torrance, CA (US); Dale L. Smith, Redondo Beach, CA (US); Nemo Z. Taylor, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 156 days.

(21) Appl. No.: 16/816,087

(22) Filed: Mar. 11, 2020

(65) Prior Publication Data

US 2021/0289494 A1 Sep. 16, 2021

(51) Int. Cl.
*H04W 4/00* (2018.01)
*H04W 72/04* (2009.01)
*H04W 72/08* (2009.01)

(52) U.S. Cl.
CPC ..... *H04W 72/0446* (2013.01); *H04W 72/042* (2013.01); *H04W 72/046* (2013.01); *H04W 72/0413* (2013.01); *H04W 72/08* (2013.01)

(58) Field of Classification Search
None
See application file for complete search history.

(56) References Cited

U.S. PATENT DOCUMENTS

| 6,377,561 B1 | 4/2002 | Black et al. | |
| 2005/0250509 A1* | 11/2005 | Choksi | H04L 47/6215 455/452.1 |
| 2014/0177521 A1 | 6/2014 | Agarwal | |
| 2015/0024677 A1 | 1/2015 | Gopal et al. | |
| 2015/0312012 A1* | 10/2015 | Bhanage | H04W 72/1226 370/336 |

(Continued)

OTHER PUBLICATIONS

Berry, B., et al., "PPP over Ethernet (PPPoE) Extensions for Credit Flow and Link Metrics", IETF RFC 5578, Feb. 2010, pp. 1-24.

(Continued)

*Primary Examiner* — Clemence S Han
(74) *Attorney, Agent, or Firm* — Gates & Cooper LLP

(57) ABSTRACT

A system and method for communicating data is disclosed. The system comprises a plurality of modems for receiving uplink data and transmitting downlink data; a switch, communicatively coupled to a plurality of MODEMs, the switch comprising a plurality of data queues, the switch for switchably accepting uplink data from the plurality of MODEMs and switchably providing downlink data from the plurality of data queues to the plurality of MODEMs; and a controller, communicatively coupled to the plurality of MODEMs and the switch, the controller for providing controller information for dynamically controlling the switch to switchably accept the uplink data from the plurality of MODEMs and to switchably provide downlink data from the plurality of data queues to the one or more of the plurality of MODEMs on a per-terminal and a per-communications link basis.

20 Claims, 6 Drawing Sheets

(56) References Cited

U.S. PATENT DOCUMENTS

2015/0334771 A1* 11/2015 Li .................. H04L 5/0053
455/452.1
2020/0336263 A1* 10/2020 Halepovic ............. H04L 5/0048

OTHER PUBLICATIONS

Chisci, L., et al., "Predictive Bandwidth Control for GEO Satellite Networks", IEEE Communications Society, Jun. 2004, pp. 3958-3962.

Feldman, P., "An Overview and Comparison of Demand Assignment Multiple Access (DAMA) Concepts for Satellite Communication Networks", Santa Monica: RAND, 1996, pp. 1-125.

Giambene, G., "Resource Management in Satellite Networks", New York: Springer-Verlag, 2007.

Extended European Search Report dated Aug. 24, 2021 for European Patent Application No. 21159674.7.

* cited by examiner

CROSS-LAYER DESIGN FOR CLOSED LOOP FEEDBACK IN A WIRELESS NETWORK

BACKGROUND

1. Field

The present disclosure relates to systems and methods for communicating information, and in particular to a system and method for dynamically allocating communication resources.

2. Description of the Related Art

Satellite architectures for communicating information from one terminal to another terminal are known. Typically, the satellites in such architectures include a switch or router and a communicatively coupled Modulator/Demodulator (MODEM) or collection of MODEMs. The switch is used as an aggregation device that connects MODEMs uplinking information from one terminal to MODEMs downlinking information to one or more other terminals. The switch determines where packets and frames obtained are to be delivered to, and provides those packets and frames to MODEMs designated to transmit that information to the receiving terminals. The MODEMs accept/transmit RF energy (on the terminal side) and translate that RF information to digital frames of data (on the switch side).

The switch has large buffers for buffering frames during processing. Conversely, the MODEM contains small buffers (e.g. ping-pong Frame Buffers) for buffering frames during MODEM processing. The MODEM buffers have limited size and can be overflowed if more uplinked frames are passed to the buffers from the switch egress queues than are being removed from the MODEM buffers for downlinking to receiving terminals. When the buffers are overflowed, there is a danger of frames and other data being lost and unrecoverable. Further, terminal data rates can vary substantially over time. Such variance in terminal data rates increases the risk of buffer overflow.

Some terminals are mobile. Another problem arises when one of the terminals either receiving data moves from an area served by a satellite beam and channel combination (herein after referred to as a beam-channel group or downlink forwarding access (DFA) moves to another DFA served by a different satellite beam and/or channel. In these circumstances, systems have the DFA follow the terminal around to the new location (e.g. by manipulating the satellite beams) or reattach the terminal to the satellite under a new DFA. Having the DFA follow the terminal around is difficult implement for large numbers of terminals, and reattaching the terminal to the satellite on a new DFA typically results in packet loss.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a system and method for communicating data. One example is described by a system for communicating data from a plurality of communication terminals including a first communication terminal served by a first communications link having a combination of beams and channels serving a first area and a second communication terminal served by a second communications link having a second combination of beams and channels serving a second area. The system comprises a plurality of MODEMs for receiving uplink data and transmitting downlink data; a switch, communicatively coupled to a plurality of MODEMs, the switch comprising a plurality of data queues, the switch for switchably accepting uplink data from the plurality of MODEMs and switchably providing downlink data from the plurality of data queues to the plurality of MODEMs; and a controller, communicatively coupled to the plurality of MODEMs and the switch, the controller for providing controller information for dynamically controlling the switch to switchably accept the uplink data from the plurality of MODEMs and to switchably provide downlink data from the plurality of data queues to the one or more of the plurality of MODEMs on a per-terminal and a per-communications link basis.

Another embodiment is evidenced by a method of transitioning a communication terminal from a first communications link to a second communications link, for example implemented in a system for communicating data from a first communication terminal to a second communication terminal, the system comprising a plurality of MODEMs for receiving uplink data and transmitting downlink data, a switch communicatively coupled to the MODEMs, the switch comprising a plurality of data queues, the switch for switchably accepting uplink data from the plurality of MODEMs and switchably providing downlink data to the plurality of MODEMs, and a controller communicatively coupled to the MODEMs and the switch, the controller for controlling the switch to switchably accept the uplink data from the plurality of MODEMs and to switchably provide downlink data from the data queues to the plurality of MODEMs. The method comprises determining that the communications terminal is predicted to leave a first area served by the first communications link and enter a second area served by the second communications link, and dynamically and losslessly relinking the plurality of data queues associated with the communications terminal from the first communications link to the second communications link. Another example is described by dynamically and losslessly relinking all of the plurality of data queues associated with the communications terminal from the first communications link to the second communications link comprises accepting queue occupancy data, the queue occupancy data describing an occupancy of the data queues, determining the relinking of all of the plurality of data queues associated with the communications terminal from the first communications link to the second communications link based upon the queue occupancy data and a predicted area served by the second communications link, and relinking the first set of the plurality of data queues from a first set of one of more of the plurality of MODEMs to a second set of one or more of the plurality of MODEMs.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

Figure 1:
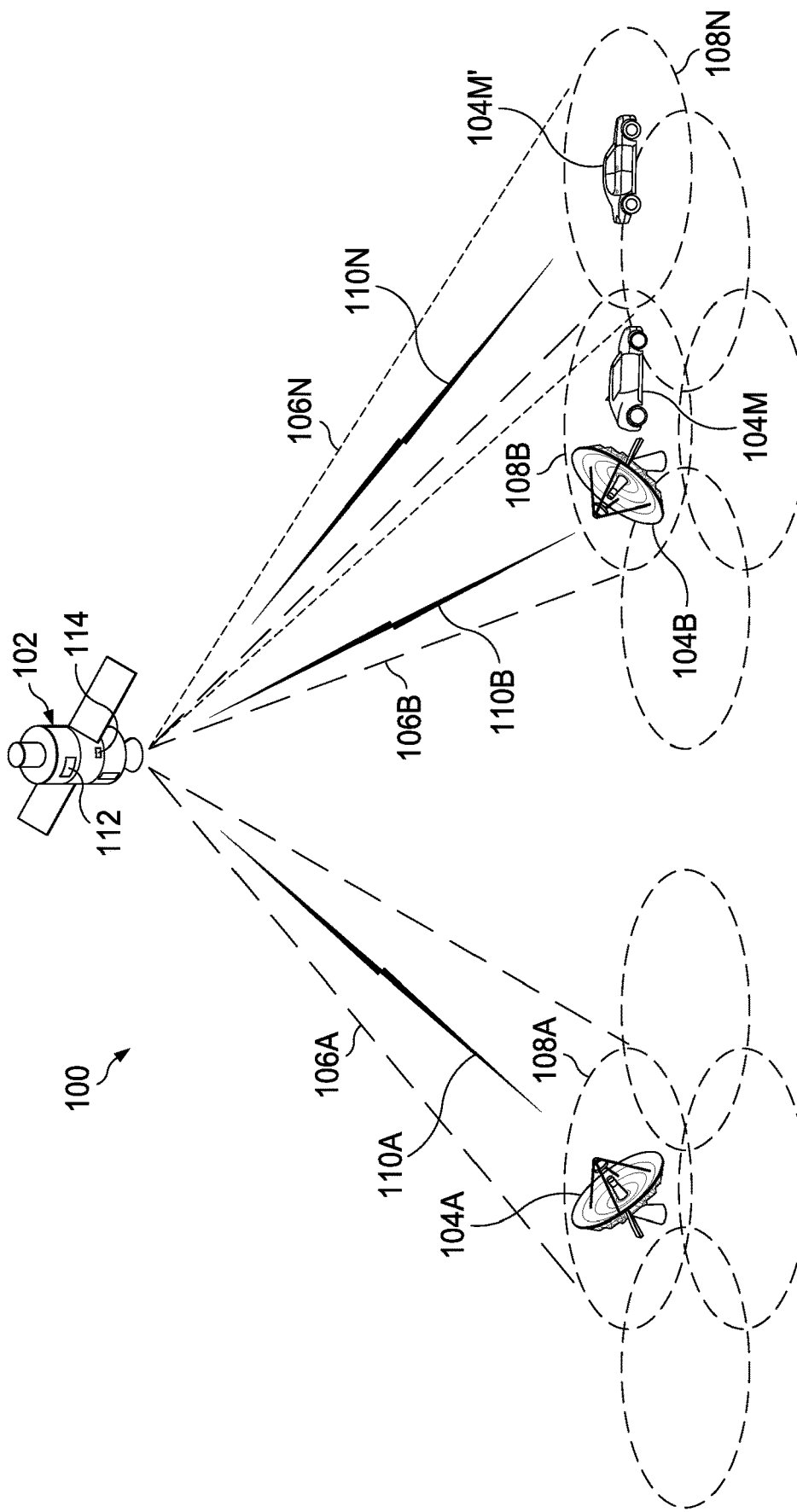
FIG. 1 is a diagram illustrating one embodiment of a communication system.

In the following description, reference is made to the accompanying drawings which form a part hereof, and which is shown, by way of illustration, several embodiments. It is understood that other embodiments may be utilized, and structural changes may be made without departing from the scope of the present disclosure. To the extent that terms "includes," "including," "has," "contains," and variants thereof are used herein, such terms are intended to be inclusive in a manner similar to the term "comprises" as an open transition word without precluding any additional or other elements.

Overview

Integration of physical layer (Layer 1) in the MODEM and media access control layer (Layer 2) functions in the L2 Switch provides a system that is more responsive to changes in the offered load or environmental conditions in which the system is operating. This invention describes multiple cross-layer design tactics used to effectively couple a Demand Assigned Multiple Access (DAMA) and Adaptive Coding and Modulation (ACM) capable MODEM, a QoS-aware L2 Switch, associated MODEM and Switch Controller functions, and an Adaptive Coding and Modulation/Demand Assigned Multiple Access (ACM/DAMA) algorithm such as a Dynamic Resource Allocation (DRA) algorithm. Finally, a Dynamic Queue Relinking function is provided, allowing a collection of per-Class of Service/per-Terminal queues to be dynamically relinked from one downlink carrier to another, providing seamless (i.e. all terminal applications persist across the mobility event) mobility performance for both Dynamic Resource Allocation and Terminal Mobility scenarios. In scenarios where the terminal supports simultaneous multi-beam attachment, the Dynamic Queue Relinking supports lossless mobility performance for both DRA and terminal mobility scenarios, using Make-Before-Break handover tactic.

This addresses the logical coupling between the constantly changing user terminal data rates managed by the Dynamic Resource Allocation algorithm (related to the DAMA function in the MODEM), the Adaptive Coding and Modulation function in the MODEM that dynamically changes the modulation and coding used on an RF link of variable quality, the token bucket size and leak rate of the ingress policing function on the Layer 2 switch, the egress scheduling weights on the Weighted Fair Queueing scheduler on the egress (downlink) of the Layer 2 switch, the dynamic mapping of per-terminal/per-Class of Service (CoS) queues to DFA queues, and the physical coupling of the egress queues on the Layer 2 switch with the Frame Buffers on the MODEM which allows the MODEM to apply a backpressure to the Layer 2 switch at the onset of transient congestion periods.

In addition to the processing of unicast traffic, described above, a set of per-CoS multicast queues are provided on the egress-side of the switch to provide QoS-aware forwarding of multicast frames onto DFAs that contain terminals that are members of a given multicast group. The switch maintains lists of multicast group membership by snooping multicast group management traffic traversing the network control plane.

System Architecture

FIG. 1 is a diagram illustrating one embodiment of a communication system 100 used to transmit information from a first terminal 104A to a second terminal 104B. Either the first terminal 104A or the second terminal 104B can comprise a mobile terminal 104M. A terminal 104 is a collection of equipment, typically on the ground, that comprises a MODEM 114, a switcher and router (to collect and disseminate data from multiple sources in the terminal, as well as telephones, computers, and other equipment.

The communication system comprises an airborne or spaceborne vehicle such as satellite 102, which receives uplink data from the first terminal 104A via first communication like 110A and transmits the uplinked data to the second terminal 104B via second communication link 110B.

As described herein, communication links 110 defined as a communication channel implemented using a combination a beam 106 (for example, an RF beam) and channels of information being carried on that RF beam 106. For example, communications link 110A is implemented by beam 106A and one or more channels of information transmitted on those channels. "Channels" as described herein, can include channels distinguished from one another via any multiple access paradigm, including frequency division multiple access (FDMA), time division multiple access (TDMA), code division multiple access (CDMA), or any combination thereof. Each communication link 110A-110N services a respective area 108A-108N. In embodiments where the satellite 102 is in geosynchronous or geostationary orbit (GEO), the geographic areas 108 serviced by the satellite 102 do not move with time, but remain stationary. In other embodiments (satellites 102 in other than GEO orbits, for example, a medium earth orbit (MEO) or low earth orbit (LEO), or an airborne vehicle), the areas 108 can change with time as the satellite 102 moves. Communication links 110 will also hereinafter alternatively be referred to as a downlink forward access area or (DFA) 100.

As described above, terminals 104 may be stationary or may be mobile (represented by 104M), and hence, a mobile terminal 104M can move from area 108B to another area 108N as indicated by the mobile terminal 104M'.

The satellite 102 includes one or more switches 112 communicatively coupled to one or more MODEMs 114. As described herein, the MODEMS 114 include, for example, a "software-defined radio (SDR)" which allows the MODEM to instantiate a variety of waveforms (e.g. 2G/3G/4G/5G cellular, MF-TDMA VSAT waveforms, spread spectrum DoD waveforms, etc.) via either software upload or firmware configuration. The function of the MODEMs 114 is to perform accept RF signals (Layer 1) uplinked from terminals 104 and to generate frames of data (Layer 2) from those RF signals and provide them to the switch 112 for dissemination to the same or other MODEMs, as well as to accept frames of data from the switch 112, generate RF signals from those frames, and downlink those signals to one or more of the terminals 104. The switch 112 is an aggregation device that is communicatively coupled to the MODEMs and determines which is communicatively coupled to the MODEMs 114 to accept packets or frames from the MODEMs 114, determine which MODEMs 114 the received packets and frames should be routed to, and routing those packets and frames to those MODEMs.

The switch 112 and the MODEMs 114 communicate via an interface such as SERDES. SERDES (serializer/deserializer) is a pair of functional blocks (serializer and deserializer) commonly used in high speed (3.125-112 Gb/s) communication. The blocks convert data between serial data and parallel data interfaces in each direction. A SERDES standard has been adopted, namely IEEE 802.3, which is hereby incorporated by reference.

Dedicated Data Queues

Figure 2A:
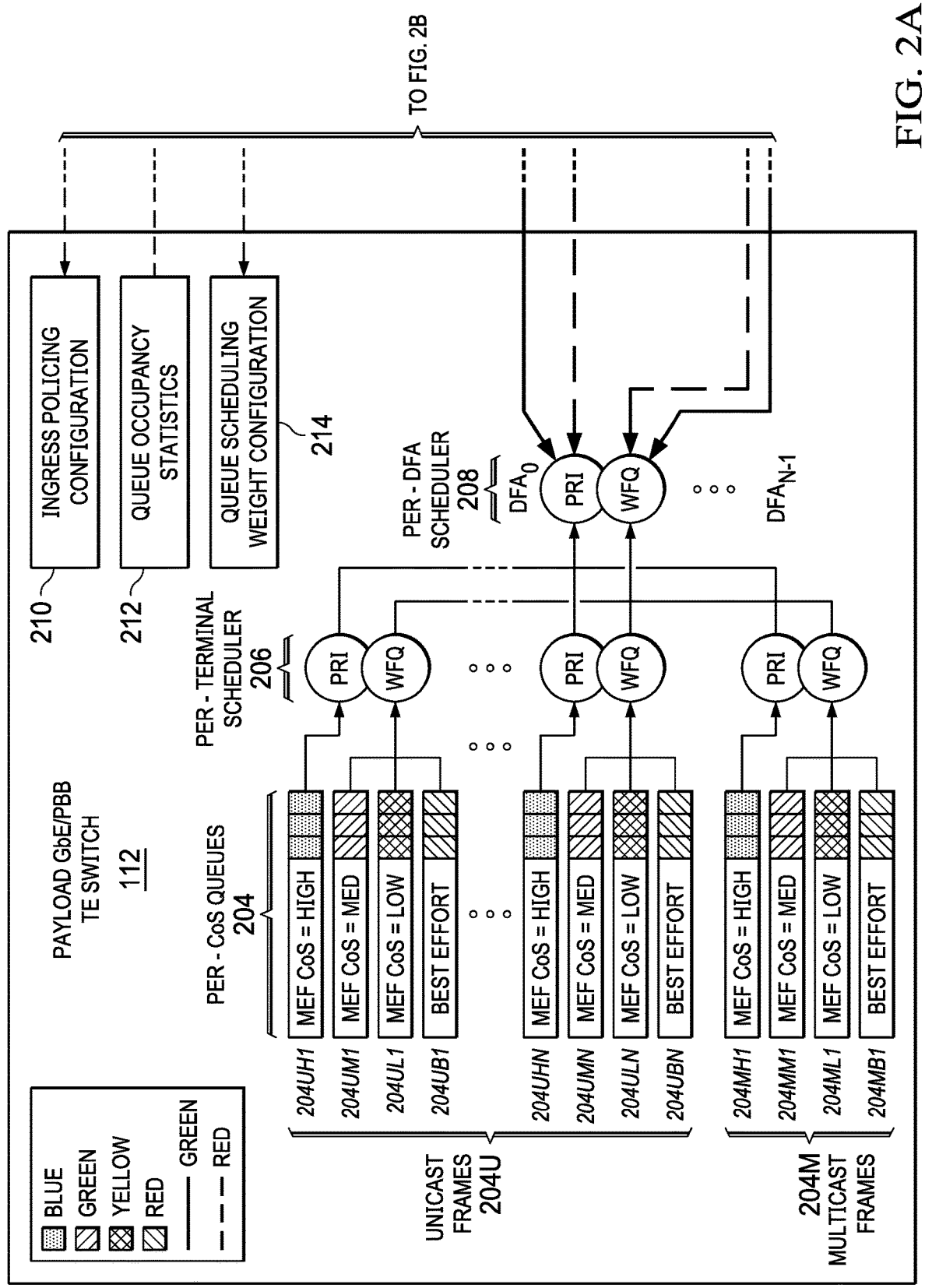
FIGS. 2A and 2B are diagrams of the switch, a MODEM, and a controller.
Figure 2B:
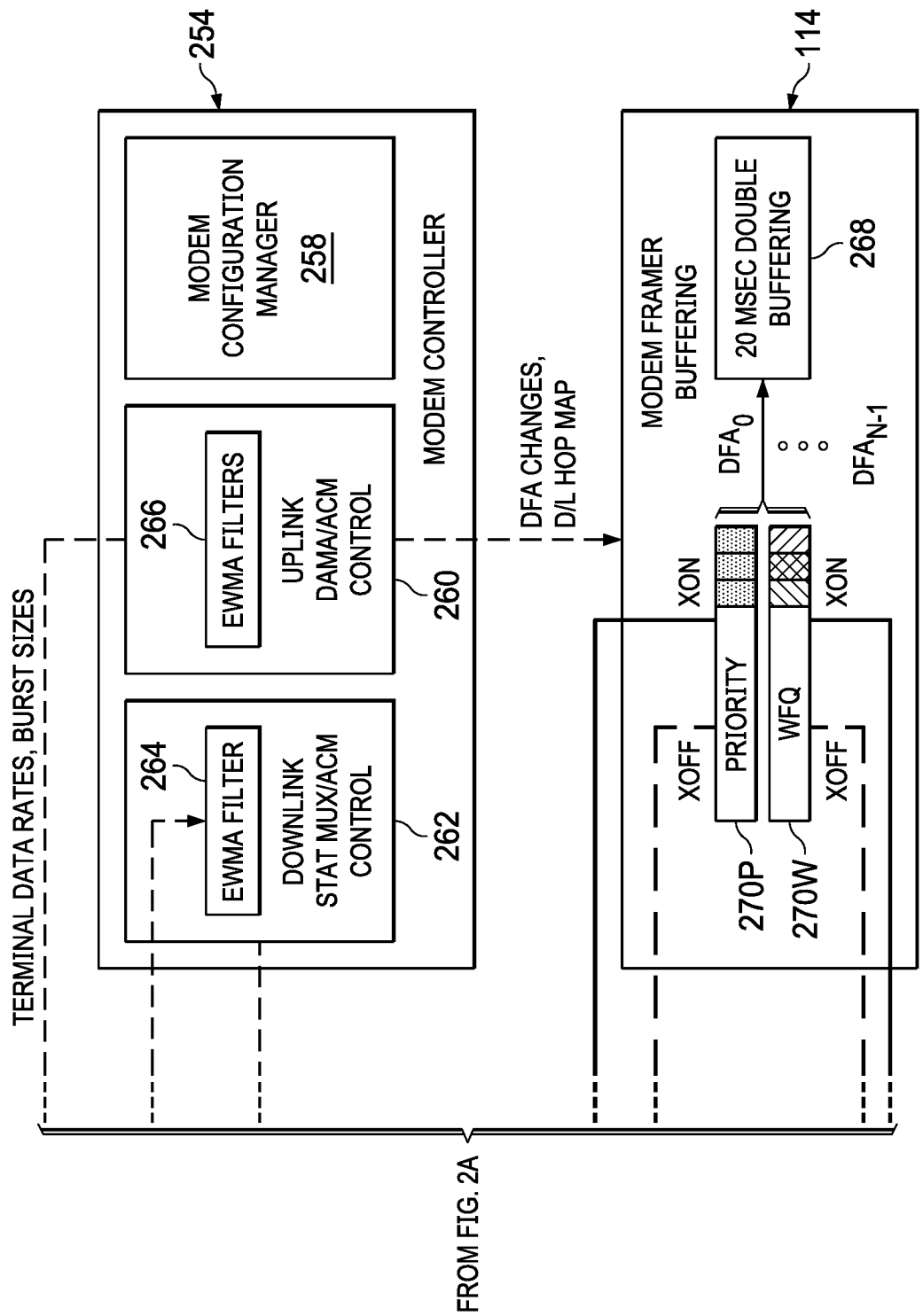

FIGS. 2A and 2B are diagrams of the switch 112, a MODEM 114, and a controller 254. The controller 254 controls the switch 112 and the MODEMs 114 to implement dynamic resource allocation (DRA), and is also alternatively referred to hereinafter as a MODEM controller or DRA controller.

Each MODEM 114 comprises MODEM data queues, including a priority data queue 270P for priority data and a weighted queue 270W for other data. Each MODEM also comprises a buffer 268, which buffers data entering and leaving the MODEM 114.

The switch 112 is communicatively coupled to a plurality of MODEMs 114. The switch 112 comprises a plurality of data queues 204, and the switch 112 switchably accepts uplink data from the MODEMs 114 and switchably provides downlink data from the plurality of data queues 204 to the plurality of MODEMs 114. A MODEM controller 254, communicatively coupled to the plurality of MODEMs 114 and the switch 112 provides controller information for dynamically controlling the switch 112 to switchably accept the uplink data from the plurality of MODEMs 114 and switchably provide downlink data from the plurality of data queues 204 to one or more of the plurality of MODEMs 114 on a per-terminal 104 and per-communications link 110 basis. In one embodiment, the controller information is determined at least in part from an occupancy (data fullness) of the data queues 204.

The switch 112 comprises a plurality of data queues 204, a per-terminal scheduler 206, a per-DFA scheduler 208, an ingress policing module 210, a queue occupancy statistics module 212, and a data queue scheduling and weight configuration module 214. The switch data queues 204 include queues for unicast frames 204U and multicast frames 204M. Different queues 204 are provided for data associated with different Class of Service (CoS) requirements and hence priorities, which can be defined, for example by the Metro Ethernet Forum (MEF) to include high quality of service 204UH1-204UHN and 204MH1, medium quality of service 204UM1-204UMN and 24MM1, low quality of service 204UL1-204ULN and 204ML1, and best effort quality of service 204UB1-204UBN and 204MB1.

Every terminal 104 has its own set of CoS queues 204. Therefore, for example, queues 204UH1, 204UM1, 204UL1, and 204UB1 can all be dedicated to a particular terminal 104. All of the communication traffic for that terminal 104 is handed by a set of queues 204 that are not shared with other terminals, and the occupancy of the plurality of data queues is determined on a per-terminal basis and per-DFA basis.

This design results in several advantages. This granularity of queueing allows a set of queues to be dynamically relinked from one DFA (e.g. communication link 110) to another without loss of data. A DFA 110 is a combination of beams and channels used by the satellite 102 to communicate with the terminals 104. A terminal 104 can migrate from the DFA 110 currently used to communicate with the satellite (camped DFA 110) to another DFA 110 (target DFA 110) either because of change in channel assignments, or a change in the RF beam 106 used to communicate between the terminal 104 and the satellite, or both.

Changes in the DFA 110 due to changes in the RF beam 106 used to communicate with the satellite 102 are referred to as a mobility event. Since DFAs 110 are defined by a combination of beams 106 and channels of data being transmitted on those beams 106 and since those beams 106 typically serve a respective geographic area 108 that does not move with time, a mobility event occurs whenever a terminal transitions from one geographic area 108B to another geographic area 108N.

This is similar to what happens when a cellphone moves from one communication tower or sector to another. However, when such handover occurs in a cellphone system, the RF connection between the cellphone and the tower is maintained, but since the data buffers are not transferred among towers, handoff is typically accomplished at the cost of some packet loss. This can result in freezing of video data being reproduced on the cellphone (for example, because of the loss of I frames or anchor frames of video).

In contrast to the cellular handover described above, the disclosed system dedicates a set of queues to a particular terminal 104, which allows a lossless handover because the set of data queues 204 and all of the data in those queues 204 is dynamically remapped from the camped DFA 110 to the target DFA 110, thus avoiding packet loss. The dynamic remapping of the data queues 204 is implemented by a remapping module that comprises the per-terminal scheduler 206 and the per-DFA scheduler 208 updating a map in the switch 112, and providing the updated map with DFA 110 changes to the MODEMs 114. In embodiments with frequency hopping or similar schemes, a hop map can also be provided. Since the MODEM 114 receives frames or packets of data from a certain mapping of DFAs 110 on the switch 112, from the MODEM's perspective, the change is transparent. In one embodiment, the handover is synchronized by the switch 112 so that it happens on a single clock edge, so that no data frames are lost. This technique can also be referred to as dynamic queue relinking.

During mobility events, such dynamic queue relinking is accomplished when the terminal 104 transitions an epoch boundary (which is a temporal boundary 110). That a terminal has or is about to experience a mobility event and move from a camped DFA 110 to a target DFA 110 can be determined in different ways.

In one embodiment, a mobility event is determined using geographical state data (e.g. position, velocity and/or acceleration) obtained from a locating unit (such as a global positioning system or GPS receiver) at the terminal.

In another embodiment, the mobility event trigger is determined using RF data from the terminal 104. Typically, the antennas on the satellite 102 used to receive and transmit data to the terminals 104 have a sensitivity pattern in which the maximum gain is provided at the center of the beam 106, and reduced gain is provided at the periphery of the beam 106. Hence, as a terminal 104 approaches an epoch boundary between the camped DFA 110B and a target DFA 110N, the power of the RF signal obtained from the terminal 104 decreases. When this power is decreased below a particular threshold, the terminal can be determined to be crossing an epoch boundary and transitioning to the target DFA 110N. The satellite 102 can determine which of the adjacent DFAs 110 is the target DFA 110N by determining if an RF signal from the same terminal 104 is received via an antenna serving another geographical area 108.

In another embodiment, the mobility event trigger is determined by the DRA Controller 254 when it determines algorithmically that one configured beam-channel grouping (i.e. the camped DFA) is to be changed to a different configured beam-channel grouping (i.e. the target DFA). In this embodiment, these beam-channel groupings (DFAs) can be overlaid geographically onto one another, either wholly or partially.

In still another embodiment, the mobility event trigger can be determined by a system operator knowing the mission profile (expected location) of the terminal 104), using either or both of the foregoing measurements other sources of location. Any of the foregoing techniques for determining epoch boundary transitions can be used in combination with others to increase accuracy of that determination or to increase system robustness.

Allocation of Dedicated Data Queues to Modems

Controller information includes per-terminal data queue scheduling information and per-DFA scheduling information. and is generated and provided by controller 254, which includes a downlink controller 262, an uplink controller 260 and a MODEM configuration manager 258. The controller 254 is alternatively referred to hereinafter as the dynamic resource allocation controller or DRA controller 262.

The DRA controller 262 uses real-time occupancy statistics obtained from the queue occupancy statistics module 212 of the switch 112 to determine how much bandwidth a terminal 104 needs at a point in time or during a defined time period, as determined by the occupancy (data fullness) of the per-COS queues in the switch 112. The DRA controller 254 informs the MODEMs 114 and the switch 112 how much throughput is allocated to each MODEM 114 in the next DRA epoch. For example, if the current epoch is N, controller information can be generated for epoch N+1 and/or N+2. A typical epoch can be 640 milliseconds.

The per-terminal scheduling information is generated by the downlink controller 262 based at least in part on the occupancy (data fullness) of the plurality of data queues 204 on a per-terminal basis (e.g. for that terminal 104) as provided by the queue occupancy statistics module 212 and data requests received by the satellite 102 via the uplink controller 260.

The per-DFA scheduling information is also generated by the downlink controller 262 based at least in part on the occupancy (data fullness) of the plurality of data queues 204 on a per-DFA basis as provided by the queue occupancy statistics module 212 and data requests received by the satellite 102 via the uplink controller 260. The controller information is provided to the queue scheduling and weight configuration module 214 and used for data queue 204 scheduling using the per terminal scheduler 206 and the per-DFA scheduler 208.

The per-terminal scheduler 206 schedules the provision of, and switchably provides, the data in the data queue 204 to the associated terminal 104 on a per-terminal basis according to the per-terminal scheduling information. For example, the frames in data queue 204UH1 include frames that are to be delivered with a high CoS, and the per-terminal scheduler 206 provides the data in this data queue 2014UH1 to the per-DFA scheduler 208 (further described below) for ultimate provision to one or more of the MODEMs 114 at a higher priority than the remaining data queues 204UM1, 204UL1 and 204$u$B1 for this terminal 104.

Likewise, the data in data queues 204UM1, 204UL1 and 204UB1 are provided to the DFA scheduler 208 on a weighted fair queueing basis (WFQ) as determined by the queue scheduling and weight configuration module 214 for ultimate provision the MODEMs 114 and terminals. The queue scheduling and weight configuration module 214 informs the per-terminal 206 scheduler and per-DFA scheduler 208 what relative allocation of resources are to be provided to each level of queueing priority. In one embodiment, a hierarchical queueing structure is assumed with a total weight for all data types equal to unity (one) and a percentage of that total allocated to each data type. For example, a high priority data type can be allocated a weight of 0.5, and a low priority data type can be allocated with a weight of 0.1, leaving the remaining data types to be allocated the remaining 0.4 of weight.

The per-DFA scheduler 208 switchably provides the per-terminal scheduled downlink data from the plurality of queues 204 on a per-DFA basis according to the per-DFA scheduling information. For example, the data frames in data queues 204UH1, 204UM1, 204UL1 and 204UB1, once scheduled among each other for a particular terminal 104 are further rescheduled to be provided to a particular DFA 110 (e.g. the MODEM supporting that DFA 110) on a per-DFA basis.

In one embodiment, the controller 254 includes an uplink controller 260 that provides MODEM configuration data to the MODEMs 114 to configure the MODEMs to transmit the downlink data. This configuration data includes DFA 110 changes (e.g. a MODEM will be assigned to a particular DFA 110 is reassigned to a different DFA 110). Such data can include, for example, terminal-communication link maps for dynamically remapping the per-terminal and or per CoS service queues from the parked DFA 110 to the target DFA 110. In one embodiment, the uplink controller 260 also provides ingress policing information to the ingress policing information module 210 of the switch 112. This ingress policing information is first layer communication information, and can include a per-terminal token bucket filter that is used to meter and mark the data traffic to determine whether each set of data is compliant or non-compliant with a service local agreement with the associated terminal 104. If the data is compliant, it is marked on a layer 1 basis to flow through traffic. If partially compliant (e.g. the requested data rate is somewhere between the average and peak throughput, the data is marked as a candidate to be discarded instead of transmitted. If the data is non-compliant (e.g. above the peak rate that can be provided), the data can be discarded apriori. The ingress policing information provides a means by which it can be assured that terminals 104 are complying with their service level agreements. Such ingress policing information can include terminal data rates and burst sizes, and can be filtered by EWMA filters 266.

The uplink controller 260 also implements a demand assign multiple access (DAMA) communication paradigm that allows the DRA controller 262 to communicate with terminals 104 to accept data requests. For example, a terminal can transmit information indicating that at epoch N+2, the terminal 104 will require a particular throughput. The DRA controller 262 accepts requests from all terminals 104 serviced by the satellite 102 and arbitrates among them based on queueing priority and communication resources, and optimizes the allocation across all terminals.

The DRA controller 262 can also include a statistical multiplexing capability, and an adaptive coding modulation (ACM) controller. This permits the MODEMs 114 to vary modulation and coding parameters used by the MODEMs to suit the conditions present in that communications link 110. Such conditions may be provided by external sources such as for example a weather information source, or by internal sources, such as a signal strength measuring utility and the MODEMs themselves. For example, in clear sky conditions (which may be provided by external weather information sources), little error correcting is likely required, and a modulation and coding scheme will be selected which maximizes throughput, but is not robust. If the weather is not clear, a more robust coding and/or modulation scheme can be employed which provides greater error correction or resistance to errors. In this way, the downlink controller can provide information to the MODEM 114 regarding what MODEM parameters are to be used in which epoch. Since the satellite 102 is typically a bent pipe (accepting uplinked information from one terminal 104 and downlinking that information to one or more other terminals 104), the fact that a data request from a terminal 104 requires high throughput can be used to determine that another MODEM retransmitting that data to another terminal 104 is going to be required in a subsequent epoch. The generation of this information can be performed by the MODEM configuration manager 258.

The DRA controller 262 can also comprise a low-pass filter 264 for filtering the queue occupancy statistics provided by the queue occupancy statistics module 212. Filtering out high frequency variations in the queue occupancy data is important, as responding to short term variations in queue occupancy can drive the system to instability. High frequency variations represent a form of noise to the system, and filtering out such factors permits the DRA controller to focus on the slowly moving statistics of the signal. In one embodiment, the filter 264 comprises an exponential weighting moving average filter (EWMA).

In one embodiment, the switch 112 also controls each of the plurality of MODEMs 114 to defer sending uplink data to the switch 112 in order to prevent data queue 204 overflow. Typically, such deferral is only a matter of deferring a frame or two, so the switch 112 can clear the data queues 204 of data before accepting new data. This can be implemented by a direct, physical layer (layer 1), thus permitting very rapid response by the MODEM 114. For example, data and command exchange between the switch 112 and the MODEM 114 is performed over a high speed bidirectional interconnect such as the serial/deserial (SERDES) interface. This interface can be optical and allows the switch 112 to communicate directly with the MODEMs 114 without use of the DRA controller 262. Unlike the DRA controller 262, which controls the MODEMs 114 and interfaces with the switch 112 on higher layers such as layer 2 (data link), layer 3 (network), or layer 4 (transport), the use of the high speed bidirectional interface layer 1 permits a faster response. Thus, control of the elements of the communication system 100 are performed concurrently across layers, using both layer 1 and higher layers.

In one embodiment, the switch 112 communicates with the MODEMs 114 via a SERDES interface using one bit of a SERDES frame header to indicate a transmit off (XOFF=0) or transmit on (XON=1) commands, to command the MODEM 114 to stop sending data or to resume sending data, respectively.

Exemplary Implementation

Figure 3:
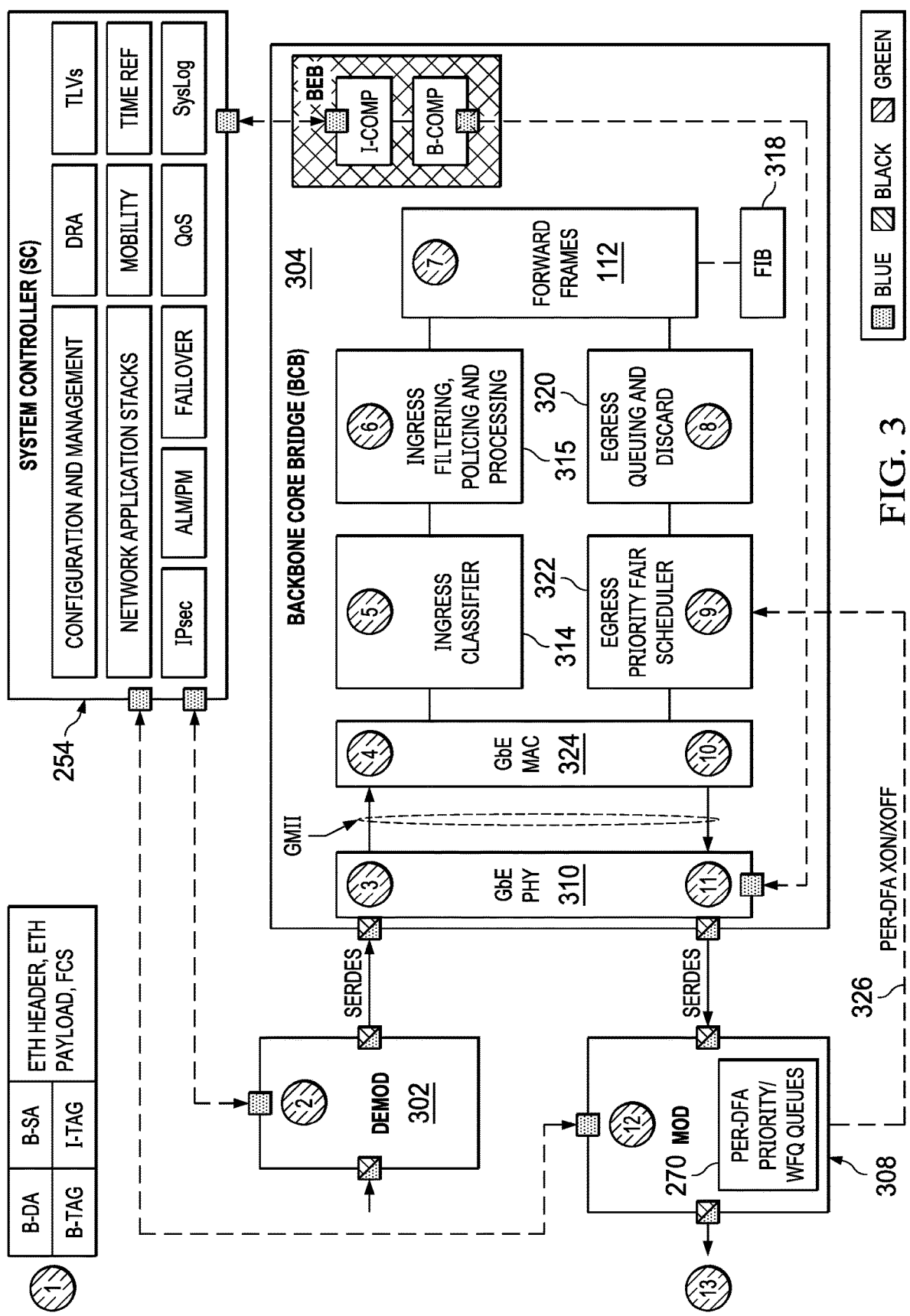
FIG. 3 is a diagram illustrating one embodiment of an exemplary system for communicating data.

FIG. 3 is a diagram illustrating one embodiment of an exemplary process for communicating data. The steps discussed below are indicated by the circled numbers depicted in FIG. 3. The demod 302 and mod 308 represent physical layer elements of the modem 114. Also some MAC/LLC layer MODEM 114 functions are hosted by the system controller 254.

In step 1, a user terminal or gateway terminal 104 creates backbone port (BP) encapsulation and forward provider backbone bridge network (PBBN) Ethernet frame to satellite payload. In step 2, a demodulator 302 of the MODEM 114 receives I & Q from an integrated phase array (IPA), demodulates and decodes the signal, reconstructs the BP encapsulated PBBN Ethernet frame, adds an internal shim header (containing the terminal 104 identifier or ID) and forwards the resulting frame over the SERDES to the back bone core bridge (BCB) via the Gbe Switch of the BCB 304.

In step 3, the ingress gigabit ether physical layer (GbE PHY) 310 performs the SERDES transceiver functions, the SERDES framing, byte sync/detection, descrambling, 8b/10b decoding, and 10/100/1000 auto-negotiation.

In step 4, the ingress GbE media access control layer (MAC) 324 validates the frame format, frame length, and frame check sequence (FCS, analogous to a checksum) of the arriving frame and updates the associated simple network management protocol (SNMP) management information base (MIB) counters. The MIB is a definition of managed objects within the modulator 308 and the demodulator 302 using SNMP. SNMP is used to grab counter values from the data queues 204 to generate queue occupancy statistics that are provided to the controller 254.

In step 5, the ingress classifier 314 of the controller 254 parses the arriving frame according to a pre-defined N-Tuple (e.g. Terminal ID, backbone destination address (B-DA), backbone source address (B-SA), backbone tag (B-TAG) priority code point (PCP) which uses a set of bits (e.g., 3 bits) to provide a value from zero to seven to indicate the priority of the received data, B-TAG discard eligibility indicator (DEI) indicating that a frame can be discarded if necessary, B-TAG video identifier (VID) and places the frame in external memory and creates frame metadata that is used to process the frame in accordance with Steps 6 and 7.

In step 6, the classified frame (metadata) is checked against configured filtering policy (e.g. access control list or ACL entries), metered and marked in accordance with an ingress policing function (implemented as a token bucket filter). This is performed by ingress filter processor 315 of the uplink controller 260.

In step 7, the BP encapsulated PBBN Ethernet frame (metadata) is forwarded through the switch 112 fabric, with the appropriate egress switch port being chosen based on the contents of the relevant row entry in a Forwarding Information Base (FIB) 318 which is analogous to a switch table. The contents of the FIB 318 are managed by the controller 254, and determines which data queues 204 are provided and switched to which MODEMs 114.

In step 8, once switched to the egress side, the egress queueing and discard module 320 of the switch 112 checks the PBBN Ethernet frame (metadata) for discard eligibility (B-TAG DEI asserted) and either discarded (when the switch 112 is operating in a congested region) or enqueued into per-CoS/per-Terminal egress queues 204 that are mapped to a unique DFA 110 by the DRA controller 262. This hierarchical egress queueing employs priority queueing for delay-sensitive traffic and weighted fair queueing for all other types of traffic.

In step 9, the egress priority fair scheduler 322 of the switch 112 schedules the PBBN Ethernet frame (metadata) for transmission. Prior to transmission, the PBBN Ethernet frame is reconstructed using the metadata and the frame contents stored in external memory. A per-DFA XON/XOFF backpressure mechanism represents a level 1 feedback loop 326, that allows the MODEM (via an XON or XOFF) to provide the switch 112 with information indicating that the MODEM's queues or buffers are full, and to momentarily pause the DFA scheduler 208 of the switch 112 during periods of transient congestion in the downlink of the MODEM 114.

In step 10, the egress GbE MAC 324 validates the frame format, frame length, and FCS of the departing frame and updates the associated SNMP MIB counters.

In step 11, the egress GbE PHY 310 performs the SERDES transceiver functions, the SERDES framing, byte sync/detection, scrambling, 8b/10b encoding, and 10/100/1000 auto-negotiation.

In step 12, the modulator 308 modulates and encodes the received digital PBBN Ethernet frame and transmits the resulting I & Q signals to the IPA for downlink transmission.

In step 13, terminal 104 (e.g. a user terminal or ground edge terminal) receives the BP-encapsulated PBBN Ethernet Frame and begins processing for transmission to the end-user or information network.

Migration of a Terminal from One DFA to Another DFA

Figure 4:
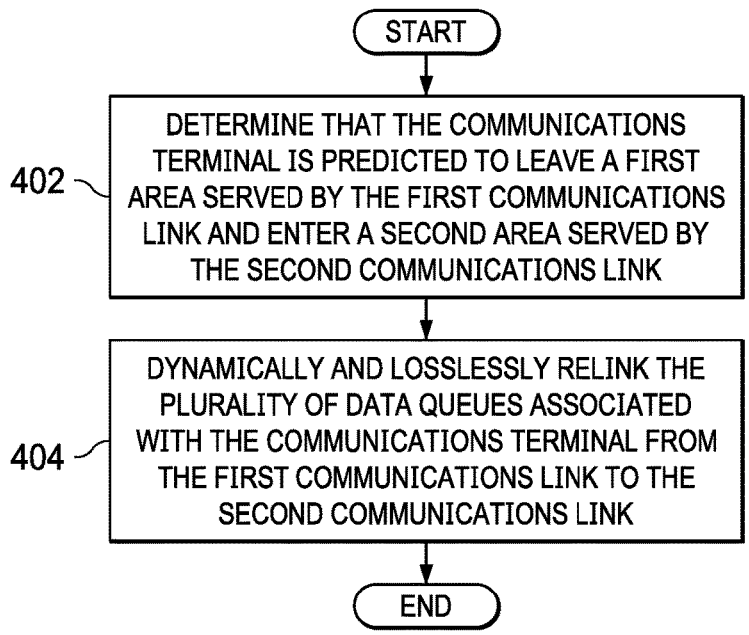
FIG. 4 is a diagram illustrating an exemplary process for communicating data for transitioning a terminal from a first communications link to a second communications link.

FIG. 4 is a diagram illustrating an exemplary process for communicating data for transitioning a terminal 104 from a first communications link 110B to a second communications link 110N. In block 402, a determination is made that the communications terminal 104 is predicted to leave a first communications area 108B served by a first communications link 110B and enter a second communications area 108N served by the second communications link 110N. In block 404, the plurality of data queues 204 associated with the communications terminal 104 are dynamically (e.g., in response to the determination) and losslessly relinked from the first communications link 110B to the second communications link 110N. This can be accomplished, for example by making changes in an allocation table such as the FIB 318. As described above, the first communications link 110B comprises a first combination of RF beams 106 and channels and the second communications link comprises a second combination of RF beams 106 and channels. In one embodiment, the RF beam 106 and channel combinations are mutually exclusive. That is, the first combination of RF beams 110B and channels serves only a first area 108B and the second combination of RF beams and channels 110N serve only a second area 108N different than the first area.

The operations of block 402 can be performed by receiving data describing a location of the terminal (for example, a GPS-derived signal) and predicting that the communications terminal 104 will or has left the first area 108B and entered the second (and typically adjacent) area 108N. In another embodiment, this is accomplished by monitoring a power of an RF signal of the first communications link 100B, and predicting that the communications terminal 104 will leave the first area 108B and enter the second area 108N (e.g. as indicated by moving from 104B to 104N) using the monitored power of the RF signal. As described earlier in this disclosure, this uses the sensitivity of the antenna pattern used to transmit and/or receive the RF beam 106 to determine that the terminal 104 is nearing an edge where the sensitivity is lower than it is in the center of the RF beam 106.

In one embodiment, the communications terminal 104 has a dedicated subset of the plurality of data queues 204 on the satellite that are not shared with any other communications terminal. Such data queues 204 can include a data queue for each quality of service provided by the terminal 104.

Figure 5:
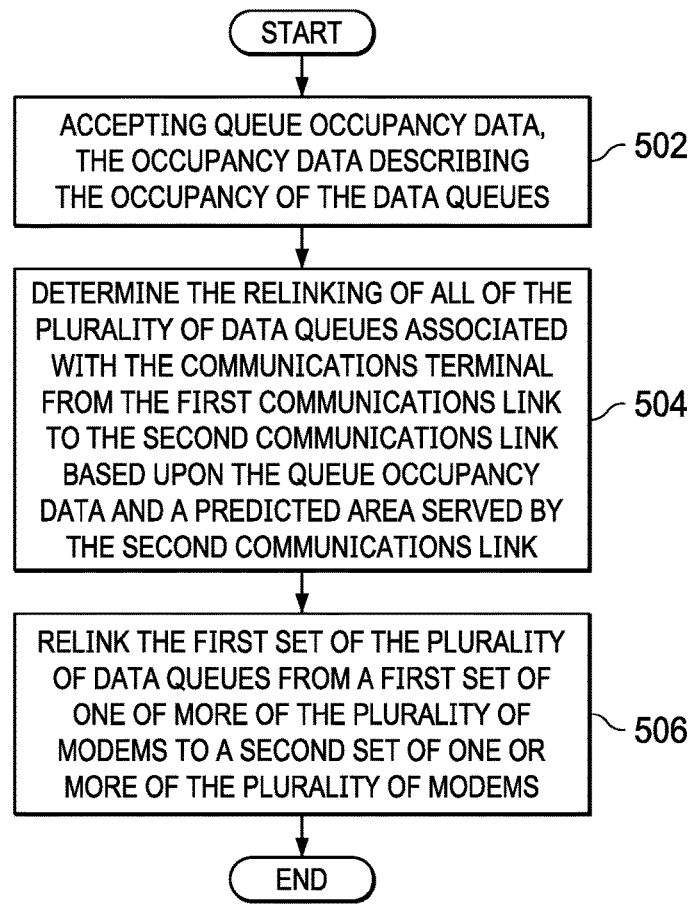
FIG. 5 is a diagram illustrating an exemplary process for dynamically and losslessly relinking all of the plurality of data queues associated with the communications terminal from the first communications link to the second communications link.

FIG. 5 is a diagram illustrating an exemplary process for dynamically and losslessly relinking all of the plurality of data queues associated with the communications terminal from the first communications link to the second communications link.

In block 502, queue occupancy data that describes the occupancy of the data queues 204 is accepted. In block 504, the relinking of all of the plurality of data queues 204 associated with the communications terminal 104 from the first communications link 110B to the second communications link 110N are determined based upon the queue occupancy data and a predicted area 108N served by the second communications link 110N. Finally, in block 506, the first set of the plurality of data queues 204 are relinked from a first set of the one or more of the plurality of MODEMs 114 to a second set of the one or more of the plurality of MODEMs 114.

Hardware Environment

Figure 6:
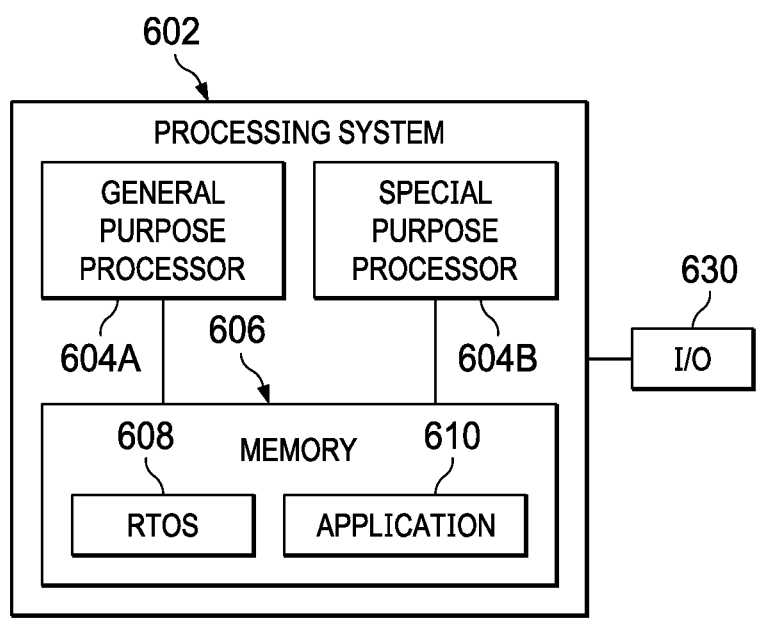
FIG. 6 illustrates an exemplary computer or processing system 600 that could be used to implement processing elements of the above disclosure, including the switch, MODEMs and controller.

FIG. 6 illustrates an exemplary processing system 602 that could be used to implement processing elements of the above disclosure, including the switch 112, MODEMs 114 and DRA controller 254. The processing system 602 comprises a processor 604 and a memory, such as random access memory (RAM) 606. The processing system 602 operates under control of an operating system such as real-time operating system (RTOS) 608 stored in the memory 606, and interfaces with system elements to accept input data and commands to process information to generate output data and further commands according to processor instructions included in the application 610. The processing system 602 communicates with other system elements via an input/output (I/O bus 630).

In one embodiment, instructions implementing the RTOS 608, the application 610, and the compiler 612 are tangibly embodied in a computer-readable medium such as the memory 606, which can comprise hardware memory or firmware memory.

Further, the RTOS 608 and the computer program 610 are comprised of instructions which, when read and executed by the processing system 602, causes the processing system 602 to perform the operations herein described. The terms "article of manufacture," "program storage device" and "computer program product" as used herein are intended to encompass an application 610 or operating system 608 accessible from any processing device-readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

The foregoing discloses an apparatus, method and system for communicating data from a plurality of communication terminals including a first communication terminal served by a first communications link having a combination of beams and channels serving a first area and a second communication terminal served by a second communications link having a second combination of beams and channels serving a second area. The apparatus includes a plurality of modems for receiving uplink data and transmitting downlink data; a switch, communicatively coupled to a plurality of modems, the switch including a plurality of data queues, the switch for switchably accepting uplink data from the plurality of modems and switchably providing downlink data from the plurality of data queues to the plurality of modems; and a controller, communicatively coupled to the plurality of modems and the switch, the controller for providing controller information for dynamically controlling the switch to switchably accept the uplink data from the plurality of modems and to switchably provide downlink data from the plurality of data queues to the one or more of the plurality of modems on a per-terminal and a per-communications link basis.

Implementations may include one or more of the following features:

Any apparatus described herein, wherein the controller information is determined at least in part from occupancy of the plurality of data queues.

Any apparatus described herein, wherein the occupancy of the plurality of data queues is determined on a per terminal basis; the controller information includes per-terminal data queue scheduling information; the controller includes: an uplink controller module for receiving requests from the plurality of communication terminals; and a downlink controller module for generating the per-terminal data queue scheduling information at least in part from the occupancy of the plurality of data queues and the received requests.

Any apparatus described herein, wherein the switch includes a per-terminal scheduler for switchably providing downlink data from the plurality of data queues to the plurality of modems on a per-terminal basis according to the per-terminal data queue scheduling information.

Any apparatus described herein, wherein the occupancy of the plurality of data queues is further determined on a per-communication link basis; the downlink controller module further generates per-communications link data queue scheduling information at least in part from the occupancy of the plurality of data queues and the received requests; and the switch includes a per-communications link scheduler for switchably providing the per-terminal scheduled downlink data on a per-communications link basis according to the per-communications link scheduling information.

Any apparatus described herein, wherein the uplink controller module further provides modem configuration data to configure the modems to transmit the downlink data.

Any apparatus described herein, wherein the modem configuration data includes terminal-communication link maps for dynamically remapping per-terminal/per class service queues to be dynamically remapped from the first communication link to the second communication link.

Any apparatus described herein, wherein the uplink controller module further provides ingress policing information to the switch.

Any apparatus described herein, wherein the ingress policing information includes per-terminal token bucket filter, marking uplink data as compliant, partially compliant or non-compliant with required terminal quality of service.

Any apparatus described herein, wherein the switch further controls each of the plurality of modems to defer sending uplink data to the switch.

Any apparatus described herein, wherein the switch controls each the plurality of modems to defer receiving uplink data from the switch via transmission of physical layer data to the modems.

Any apparatus described herein, wherein the physical layer data is transmitted via a high speed bi-directional interface.

Another embodiment is evidenced by a method of transitioning a communication terminal from a first communications link to a second communications link a system for communicating data from a first communication terminal to a second communication terminal, the system including a plurality of modems for receiving uplink data and transmitting downlink data, a switch communicatively coupled to the modems, the switch including a plurality of data queues, the switch for switchably accepting uplink data from the plurality of modems and switchably providing downlink data to the plurality of modems, and a controller communicatively coupled to the modems and the switch, the controller for controlling the switch to switchably accept the uplink data from the plurality of modems and to switchably provide downlink data from the data queues to the plurality of modems. The method includes determining that the communications terminal is predicted to leave a first area served by the first communications link and enter a second area served by the second communications link; and dynamically and losslessly relinking the plurality of data queues associated with the communications terminal from the first communications link to the second communications link.

Implementations may include one or more of the following features:

Any method described herein, wherein the uplink data is provided on a first communication link including a first combination of beams and channels; and the downlink data is provided on a second communication communications link includes a second combination of beams and channels.

Any method described herein, wherein the first combination of beams and channels serve only a first geographic area and the second combination of beams and channels serve a second geographic area.

Any method described herein, wherein determining that the communications terminal is predicted to leave a first area served by the first communications link and enter a second area served by the second communications link includes: receiving data describing a location of the communications terminal; and predicting that the communications terminal will leave the first area and enter the second area according to the received data.

Any method described herein, wherein determining that the communications terminal is predicted to leave a first area served by the first communications link and enter a second area served by the second communications link includes: monitoring a power of a signal of the first communications link; and predicting that the communications terminal will leave the first area and enter the second area using the monitored power of the signal.

Any method described herein, wherein the communications terminal has a dedicated subset of the plurality of data queues not shared with any other communications terminal.

Any method described herein, wherein the plurality of data queues include a data queue for each quality of service.

Any method described herein, wherein the plurality of data queues is selectably associated with the first communications link and the second communications link by a forwarding information base.

Any method described herein, wherein dynamically and losslessly relinking all of the plurality of data queues associated with the communications terminal from the first communications link to the second communications link includes: accepting queue occupancy data, the queue occupancy data describing an occupancy of the data queues; determining the relinking of all of the plurality of data queues associated with the communications terminal from the first communications link to the second communications link based upon the queue occupancy data and a predicted area served by the second communications link; and relinking the first set of the plurality of data queues from a first set of one of more of the plurality of modems to a second set of one or more of the plurality of modems.

Any method described herein, wherein methods further include filtering the queue occupancy data according to a low-pass filter. The methods may also include cross-layer design for closed loop feedback in a wireless network.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A system for communicating data from a plurality of communication terminals comprising a first communication terminal served by a first communications link having a combination of beams and channels serving a first area and a second communication terminal served by a second communications link having a second combination of beams and channels serving a second area, comprising:
    a plurality of modems for receiving uplink data and transmitting downlink data;
    a switch, communicatively coupled to a plurality of modems, the switch comprising a plurality of data queues, the switch configured to switchably accept uplink data from the plurality of modems and switchably provide downlink data from the plurality of data queues to the plurality of modems; and
    a controller, communicatively coupled to the plurality of modems and the switch, the controller configured to provide controller information that is employable to control the switch to switchably accept the uplink data from the plurality of modems and to switchably provide downlink data from the plurality of data queues to one or more of the plurality of modems on at least one of a per-terminal basis or a per-communications link basis;
    wherein the controller information is determined at least in part from occupancy of the plurality of data queues;
    the controller information comprises per-communications link data queue scheduling information;
    the controller comprises:
        an uplink controller module configured to receive a request from at least one of the plurality of communication terminals; and
        a downlink controller module configured to generate the per-communication link data queue scheduling information at least in part from the occupancy of the plurality of data queues and the received request; and
    the switch comprises a per-communications link scheduler configured to switchably provide the per-communication link data queue scheduling information on a per-communications link basis according to the per-communications link data queue scheduling information.

2. The system of claim 1, wherein:
    the occupancy of the plurality of data queues is further determined on a per-terminal basis;
    the controller information further comprises per-terminal data queue scheduling information;
    the downlink controller module is further configured to generate the per-terminal data queue scheduling information at least in part from the occupancy of the plurality of data queues and the received request; and
    the switch further comprises a per-terminal scheduler configured to switchably provide downlink data from the plurality of data queues to the plurality of modems on a per-terminal basis according to the per-terminal data queue scheduling information.

3. The system of claim 2, wherein the uplink controller module is further configured to provide modem configuration data to configure the modems to transmit the downlink data.

4. The system of claim 3, wherein the modem configuration data comprises terminal-communication link maps employable to remap at least one of a per-terminal or per class service queue from the first communication link to the second communication link.

5. The system of claim 2, wherein the uplink controller module is further configured to provide ingress policing information to the switch.

6. The system of claim 5, wherein the ingress policing information comprises per-terminal token bucket filter, marking uplink data as compliant, partially compliant or non-compliant with required terminal quality of service.

7. The system of claim 1, wherein the switch is further configured to control a modem of the plurality of modems to defer sending uplink data to the switch.

8. The system of claim 7, wherein the switch is further configured to control the modem to defer receiving uplink data via transmission of physical layer data to the modem.

9. The system of claim 8, wherein the physical layer data is transmitted via a high speed bi-directional interface.

10. In a system for communicating data from a first communication terminal to a second communication terminal, the system comprising a plurality of modems for receiving uplink data and transmitting downlink data, a switch communicatively coupled to the modems, the switch comprising a plurality of data queues, the switch for switchably accepting uplink data from the plurality of modems and switchably providing downlink data to the plurality of modems, and a controller communicatively coupled to the modems and the switch, the controller for controlling the switch to switchably accept the uplink data from the plurality of modems and to switchably provide downlink data from the plurality of data queues to the plurality of modems, a method of transitioning a communication terminal from a first communications link to a second communications link, comprising:

determining that the first communications terminal is predicted to leave a first area served by the first communications link and enter a second area served by the second communications link; and in response to the determining, losslessly relinking the plurality of data queues associated with the first communications terminal from the first communications link to the second communications link;

wherein the first communication terminal has a dedicated set of the plurality of data queues not shared with the second communication terminal and losslessly relinking the plurality of data queues associated with the first communication terminal from the first communications link to the second communications link comprises dynamically remapping the dedicated set of data queues from the first communications link to the second communications link.

11. The method of claim 10, wherein:
the uplink data is provided on the first communication link comprising a first combination of beams and channels; and
the downlink data is provided on the second communications link comprises a second combination of the beams and channels.

12. The method of claim 11, wherein the first combination of beams and channels serve only a first geographic area and the second combination of the beams and channels serve a second geographic area.

13. The method of claim 10, wherein determining that the communications terminal is predicted to leave a first area served by the first communications link and enter a second area served by the second communications link comprises:
receiving data describing a location of the communications terminal; and
predicting that the communications terminal will leave the first area and enter the second area according to the received data.

14. The method of claim 10, wherein determining that the communications terminal is predicted to leave a first area served by the first communications link and enter a second area served by the second communications link comprises:
monitoring a power of a signal of the first communications link; and
predicting that the communications terminal will leave the first area and enter the second area using the monitored power of the signal.

15. The method of claim 10, wherein the plurality of data queues comprise a data queue for each quality of service.

16. The method of claim 10, wherein the plurality of data queues is selectably associated with the first communications link and the second communications link by a forwarding information base.

17. The method of claim 10, wherein losslessly relinking all of the plurality of data queues associated with the communications terminal from the first communications link to the second communications link comprises:

accepting queue occupancy data, the queue occupancy data describing an occupancy of the data queues;
determining the relinking of all of the plurality of data queues associated with the communications terminal from the first communications link to the second communications link based upon the queue occupancy data and a predicted area served by the second communications link; and
relinking the plurality of data queues from a first set of one of more of the plurality of modems to a second set of one or more of the plurality of modems.

18. In a system for communicating data from a first communication terminal to a second communication terminal, the system comprising a plurality of modems for receiving uplink data and transmitting downlink data, a switch communicatively coupled to the modems, the switch comprising a plurality of data queues, the switch for switchably accepting uplink data from the plurality of modems and switchably providing downlink data to the plurality of modems, and a controller communicatively coupled to the modems and the switch, the controller for controlling the switch to switchably accept the uplink data from the plurality of modems and to switchably provide downlink data from the plurality of data queues to the plurality of modems, an apparatus for transitioning a communication terminal from a first communications link to a second communications link, comprising:
means for determining that the first communications terminal is predicted to leave a first area served by the first communications link and enter a second area served by the second communications link; and
means for losslessly relinking the plurality of data queues associated with the first communications terminal from the first communications link to the second communications link in response to the determining;
wherein the first communication terminal has a dedicated set of the plurality of data queues not shared with the second communication terminal and losslessly relinking the plurality of data queues associated with the first communication terminal from the first communications link to the second communications link comprises dynamically remapping the dedicated set of data queues from the first communications link to the second communications link.

19. The apparatus of claim 18, wherein:
the uplink data is provided on the first communication link comprising a first combination of beams and channels; and
the downlink data is provided on the second communications link comprises a second combination of the beams and channels.

20. The apparatus of claim 19, wherein the first combination of beams and channels serve only a first geographic area and the second combination of the beams and channels serve a second geographic area.

* * * * *